US009288743B2

(12) United States Patent
Yang et al.

(10) Patent No.: US 9,288,743 B2
(45) Date of Patent: Mar. 15, 2016

(54) UPLINK POWER CONTROL SCHEME FOR DISTRIBUTED RRH SYSTEMS WITH SAME CELL ID

(75) Inventors: Rongzhen Yang, Shanghai (CN); Apostolos Papathanassiou, San Jose, CA (US); Alexei Vladimirovich Davydov, Nizhny Novgorod (RU); Yuan Y. Zhu, Chao Yang District (CN); Jin Fu, Shanghai (CN); Kamran Etemad, Potomac, MD (US); Hujun Yin, Saratoga, CA (US); Xiangying Yang, Portland, OR (US); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 13/995,159
(22) PCT Filed: Sep. 30, 2011
(86) PCT No.: PCT/US2011/054274
§ 371 (c)(1),
(2), (4) Date: Jun. 17, 2013
(87) PCT Pub. No.: WO2012/134531
PCT Pub. Date: Oct. 4, 2012

(65) Prior Publication Data
US 2013/0265981 A1   Oct. 10, 2013

Related U.S. Application Data

(60) Provisional application No. 61/471,042, filed on Apr. 1, 2011.

(51) Int. Cl.
*H04W 48/10*  (2009.01)
*H04B 7/04*  (2006.01)
(Continued)

(52) U.S. Cl.
CPC ............. *H04W 48/10* (2013.01); *H04B 7/0456* (2013.01); *H04B 7/0486* (2013.01);
(Continued)

(58) Field of Classification Search
CPC ..... H04W 52/40; H04W 92/20; H04W 72/00;
(Continued)

(56) References Cited

U.S. PATENT DOCUMENTS

2008/0069039 A1 * 3/2008 Li et al. .......................... 370/329
2008/0081655 A1 * 4/2008 Shin et al. ...................... 455/522
(Continued)

FOREIGN PATENT DOCUMENTS

KR   2009-0004164 A   1/2009
KR   2009-0063085 A   6/2009
(Continued)

OTHER PUBLICATIONS

International Preliminary Report on Patentability with Written Opinion received for PCT Patent Application No. PCT/US2011/054274, mailed on Oct. 10, 2013, 7 pages.

(Continued)

*Primary Examiner* — Alpus H Hsu
*Assistant Examiner* — Dharmesh Patel
(74) *Attorney, Agent, or Firm* — Alpine Technology Law Group LLC

(57) ABSTRACT

Uplink power control in a macro cell in a wireless network comprises transmitting a reference signal from a base station device to at least one wireless device within the macro cell. The macro cell comprises the base station device and at least one radio transmitter device that is communicatively coupled to and remote from the base station device. The base station device and one or more radio transmitter devices could be selected to be a transmission point, a reception point or a combination thereof, for each wireless device. Information relating to a transmission power of the base station device is also transmitted to the at least one wireless device. An uplink signal is received from the at least one wireless device containing information relating to an uplink power determination that is based on the reference signal and the information relating to the transmission power of the base station device.

17 Claims, 7 Drawing Sheets

(51) Int. Cl.

| | | |
|---|---|---|
| *H04B 7/06* | (2006.01) | |
| *H04L 5/00* | (2006.01) | |
| *H04L 25/02* | (2006.01) | |
| *H04L 12/26* | (2006.01) | |
| *H04L 12/721* | (2013.01) | |
| *H04L 29/06* | (2006.01) | |
| *H04W 4/00* | (2009.01) | |
| *H04W 24/00* | (2009.01) | |
| *H04W 24/02* | (2009.01) | |
| *H04W 24/10* | (2009.01) | |
| *H04W 28/08* | (2009.01) | |
| *H04W 48/12* | (2009.01) | |
| *H04W 52/02* | (2009.01) | |
| *H04W 52/14* | (2009.01) | |
| *H04W 52/18* | (2009.01) | |
| *H04W 52/24* | (2009.01) | |
| *H04W 72/04* | (2009.01) | |
| *H04W 52/40* | (2009.01) | |
| *H04L 25/03* | (2006.01) | |
| *H04W 28/04* | (2009.01) | |
| *H04W 72/00* | (2009.01) | |
| *H04W 88/02* | (2009.01) | |
| *H04W 88/08* | (2009.01) | |
| *H04W 92/20* | (2009.01) | |

(52) U.S. Cl.
CPC .......... *H04B 7/0632* (2013.01); *H04B 7/0639* (2013.01); *H04L 5/003* (2013.01); *H04L 5/0037* (2013.01); *H04L 5/0094* (2013.01); *H04L 25/0226* (2013.01); *H04L 43/50* (2013.01); *H04L 45/70* (2013.01); *H04L 65/608* (2013.01); *H04W 4/005* (2013.01); *H04W 24/00* (2013.01); *H04W 24/02* (2013.01); *H04W 24/10* (2013.01); *H04W 28/08* (2013.01); *H04W 48/12* (2013.01); *H04W 52/0216* (2013.01); *H04W 52/146* (2013.01); *H04W 52/18* (2013.01); *H04W 52/242* (2013.01); *H04W 52/40* (2013.01); *H04W 72/042* (2013.01); *H04W 72/0413* (2013.01); *H04W 72/0453* (2013.01); *H04L 5/005* (2013.01); *H04L 2025/03802* (2013.01); *H04W 28/048* (2013.01); *H04W 72/00* (2013.01); *H04W 88/02* (2013.01); *H04W 88/08* (2013.01); *H04W 92/20* (2013.01)

(58) Field of Classification Search
CPC ... H04W 88/02; H04W 88/08; H04W 28/048; H04W 52/18; H04W 24/10; H04W 72/0453; H04W 24/00; H04W 52/146; H04W 24/02; H04W 28/08; H04W 72/0413; H04W 48/12; H04W 72/042; H04W 4/005; H04W 52/0216; H04W 48/10; H04W 52/242; H04B 7/0486; H04B 7/0639; H04B 7/0632; H04B 7/0456; H04L 2025/03802; H04L 65/608; H04L 5/0037; H04L 5/0094; H04L 43/50; H04L 45/70; H04L 5/003; H04L 25/0226; H04L 5/005

See application file for complete search history.

(56) References Cited

U.S. PATENT DOCUMENTS

| | | | | |
|---|---|---|---|---|
| 2010/0008282 | A1* | 1/2010 | Bhattad et al. | 370/312 |
| 2010/0309876 | A1* | 12/2010 | Khandekar et al. | 370/330 |
| 2011/0143806 | A1* | 6/2011 | Song et al. | 455/522 |
| 2012/0115463 | A1* | 5/2012 | Weng et al. | 455/425 |

FOREIGN PATENT DOCUMENTS

| | | |
|---|---|---|
| KR | 2009-0120420 A | 11/2009 |
| KR | 2010-0075994 A | 5/2010 |
| WO | 2012/134531 A1 | 10/2012 |

OTHER PUBLICATIONS

International Search Report and Written opinion for PCT Patent Application No. PCT/US2011/054274, mailed Feb. 24, 2012, 11 Pages.

Extended European Search report received for European Patent Application No. 11862632.4, mailed on Aug. 8, 2014, 8 pages.

3GPP, "Physical layer procedures", 3GPP TS 36.213 V10.0.1 (Dec. 2010), Technical Specification Group Radio Access Network, Evolved Universal Terrestrial Radio Access (E-UTRA), Release 10, 2010, 98 pages.

ETSI, "Physical layer; Measurements", 3GPP TS 36.214 version 10.1.0 Release 10, ETSI TS 136 214 V10.1.0 (Apr. 2011), Evolved Universal Terrestrial Radio Access (E-UTRA), 2011, 15 pages.

ETSI, "Protocol specification", 3GPP TS 25.331 version 10.10.0 Release 10, ETSI TS 125 331 V10.10.0 (Feb. 2013), Universal Mobile Telecommunications System (UMTS);Radio Resource Control (RRC), 2013, 1916 pages.

Alcatel-Lucent, "Further details of CoMP Scenarios for evaluation, especially Scenario 4", 3GPP TSG RAN WG1 #64, R1-110802, Feb. 21-25, 2011, 8 pages.

Ericsson, "On Simulations Assumptions for Phase 2 CaMP", 3GPP TSG-RAN WG1 #64, Feb. 21-25, 2011, 5 pages.

Intel Corporation, "Proposal on functional evaluation of the low power RRHs deployment with common Cell ID (Scenario 4)", 3GPP TSG-RAN WG1 #64, R1-110972, Feb. 21-25, 2011, 3 pages.

Nokia Siemens Networks et al., "Fractional power control setting in relay deployment", 3GPP TSG RAN WG1 #59bis Meeting, R1-1 00355, Jan. 18-22, 2010, 3 pages.

NTT Docomo, "CoMP simulation assumptions", 3GPP TSG-RAN WG1 #64, R1-111125, Feb. 21-25, 2011, 5 pages.

NTT Docomo, "CoMP with Lower Tx Power RRH in Heterogeneous Network", 3GPP TSG-RAN WG1 #64, R1-110867, Feb. 21-25, 2011, 8 pages.

Research in Motion UK Limited, "Some Design Consideration for CoMP Scenario", 3GPP TSG RAN WG1 Meeting #64, R1-110591, Feb. 21-25, 2011, 4 pages.

Samsung, "Impact of propagation attenuations and delays of CaMP composite", 3GPP TSG RAN WG1 #58, Rt-093379, Aug. 23-28, 2009, 8 pages.

* cited by examiner

UPLINK POWER CONTROL SCHEME FOR DISTRIBUTED RRH SYSTEMS WITH SAME CELL ID

CROSS-REFERENCE TO RELATED PATENT APPLICATION

The present patent application claims priority to U.S. Provisional Patent Application No. 61/471,042, filed Apr. 1, 2011. Said Application No. 61/471,042 is hereby incorporated herein by reference in its entirety.

BACKGROUND

Deployment Scenario 4 of the Cooperative Multi-Point Transmission (CoMP) Study Item (SI) for LTE Rel. 11 involves a network comprising low-power RRHs (Remote Radio Heads) within the coverage of a macro cell in which transmission/reception points have the same Cell IDs as the macro cell. The multiple transmission and reception points in the macro cell requires an efficient technique for coordinating the uplink power control the User Equipment (UE) within the macro cell.

DESCRIPTION OF THE DRAWING FIGURES

Claimed subject matter is particularly pointed out and distinctly claimed in the concluding portion of the specification. Such subject matter may, however, be understood by reference to the following detailed description when read with the accompanying drawings in which:

Figure 7:
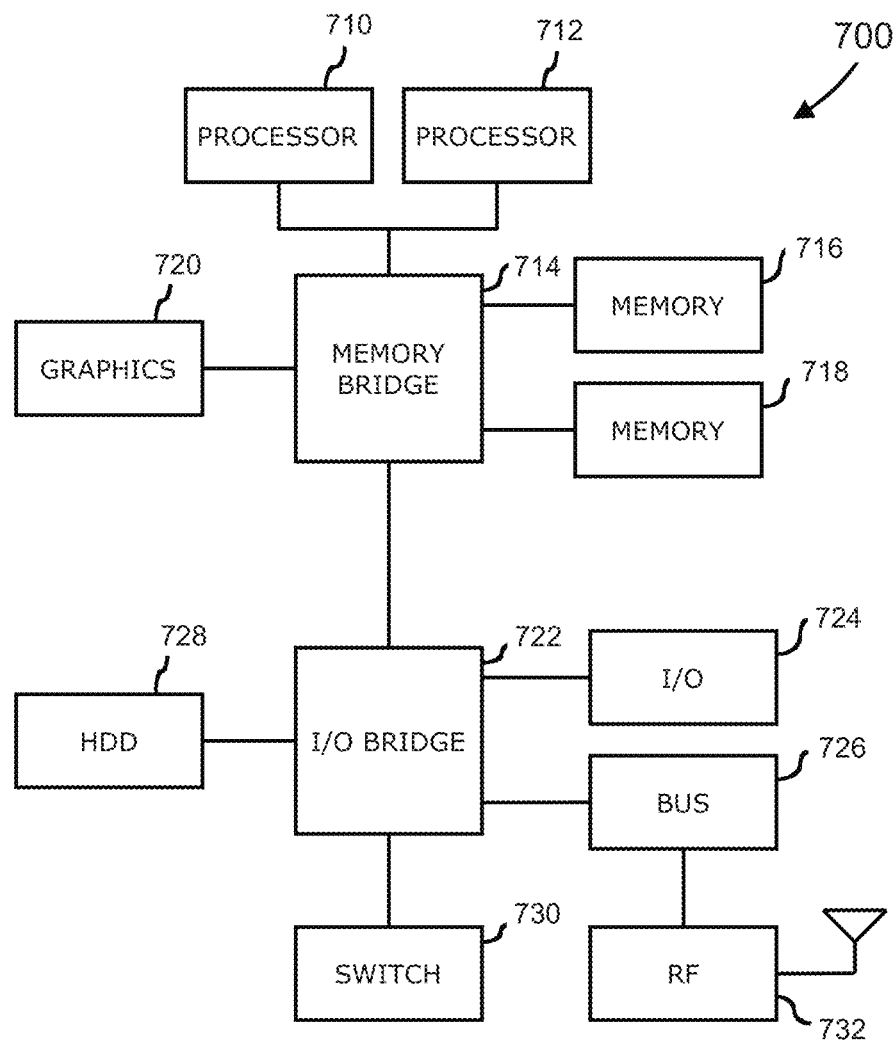
Figure 8:
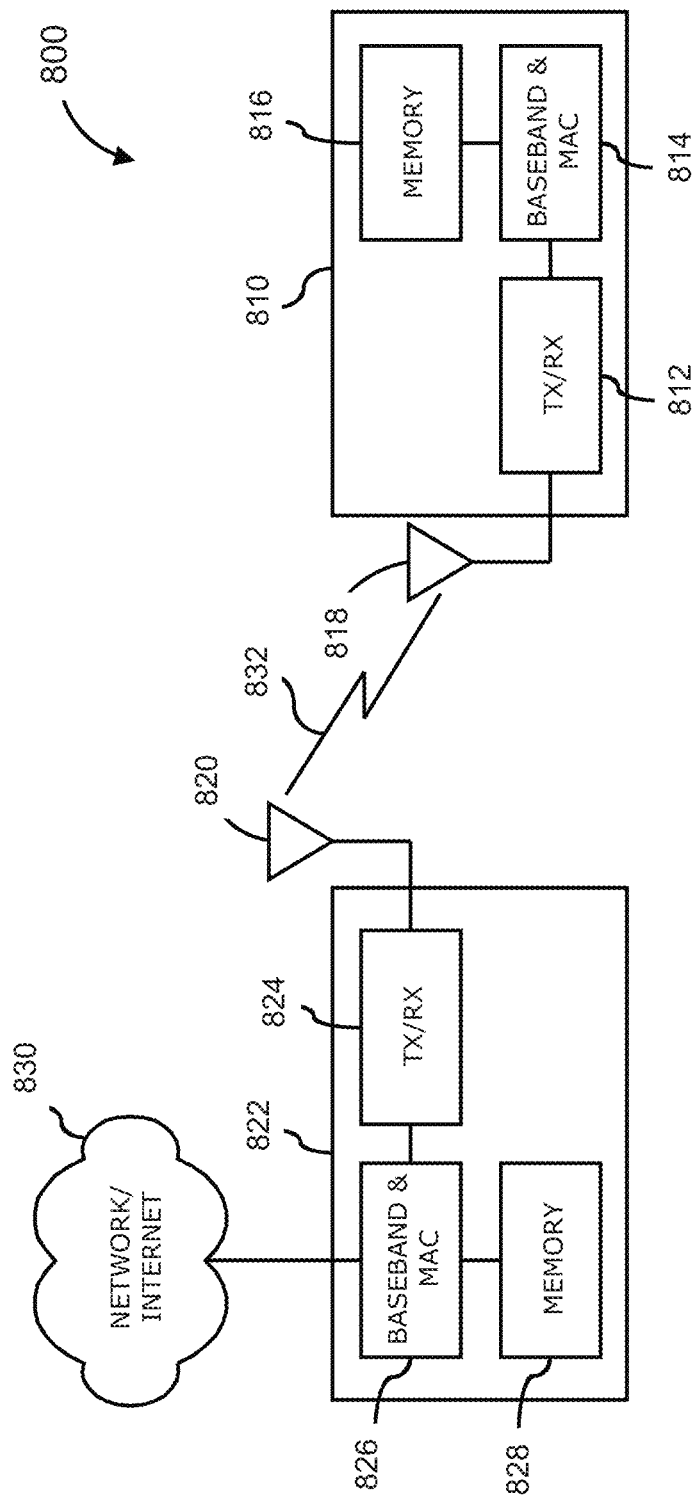

FIG. 7 depicts functional block diagram of an information-handling system utilizing utilizes uplink power control coordination according to the subject matter disclosed herein; and FIG. 8 depicts a functional block diagram of a wireless local area or cellular network communication system depicting one or more network devices utilizing uplink power control coordination according to the subject matter disclosed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. "Coupled" may, however, also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over" may, however, also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other. As used herein, the word "exemplary" means "serving as an example, instance, or illustration." Any embodiment described herein as "exemplary" is not to be construed as necessarily preferred or advantageous over other embodiments.

The subject matter disclosed herein relates to techniques for coordinating uplink power control in a macro cell in a network comprising low-power RRHs (Remote Radio Heads) within the coverage of a macro cell in which transmission/reception points have the same Cell IDs as the macro cell.

Figure 1:
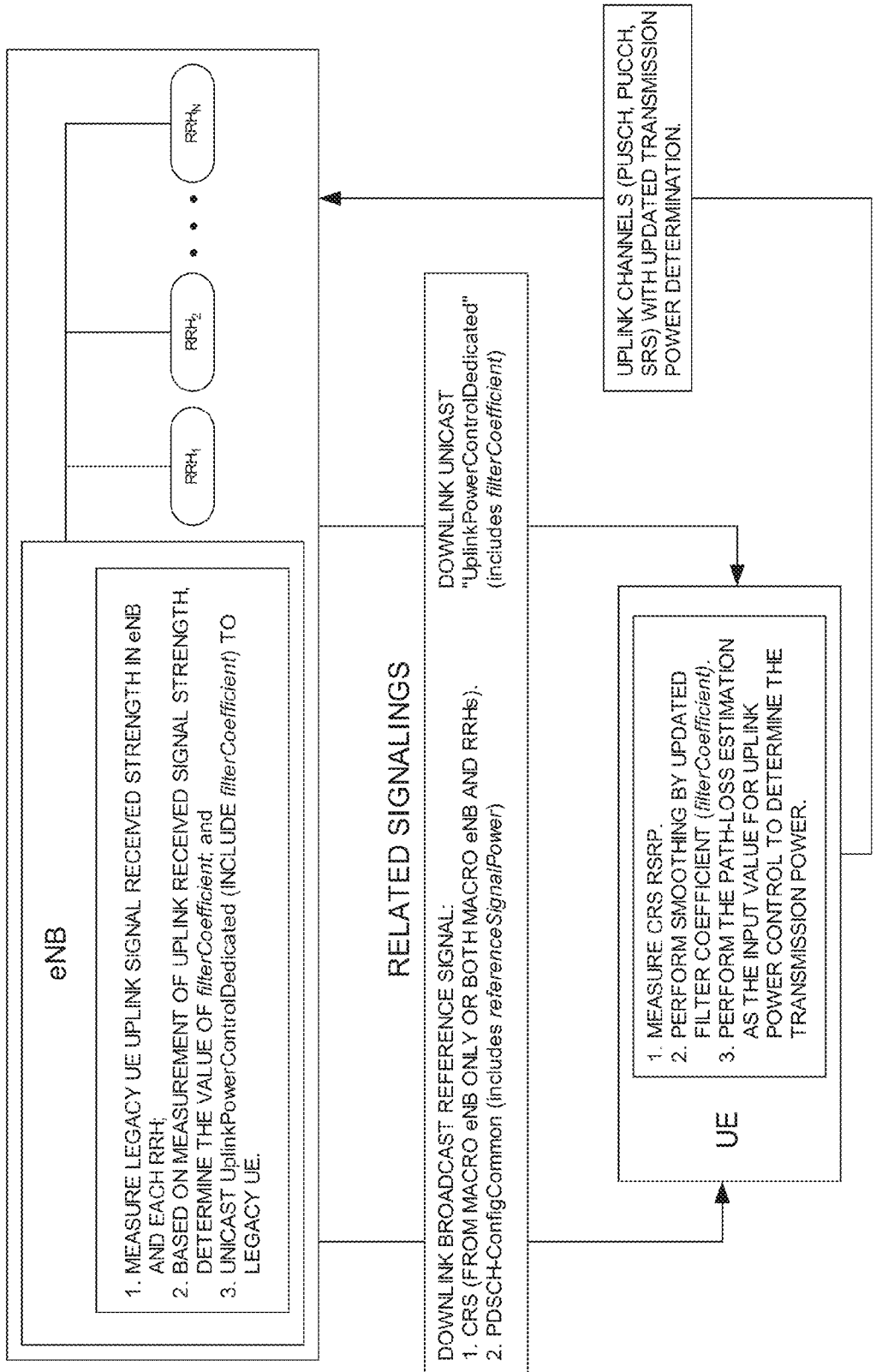
FIG. 1 depicts a CoMP SI Deployment Scenario 4 signal processing diagram for coordinating uplink power control for legacy UEs according to the subject matter disclosed herein.
Figure 2:
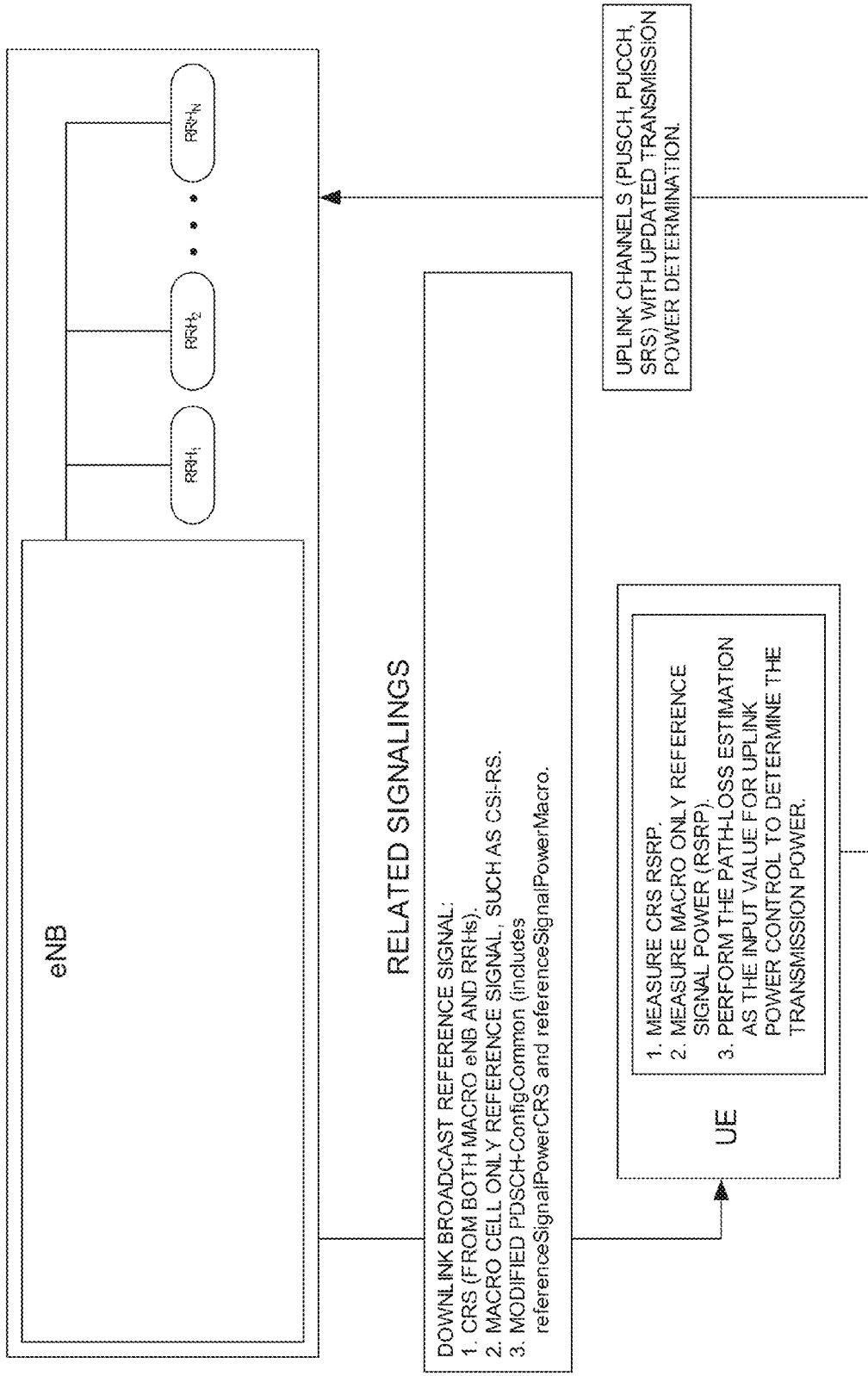
FIG. 2 depicts a CoMP SI Deployment Scenario 4 signal processing diagram for coordinating uplink power control for Rel. 11 UEs according to the subject matter disclosed herein.
Figure 3:
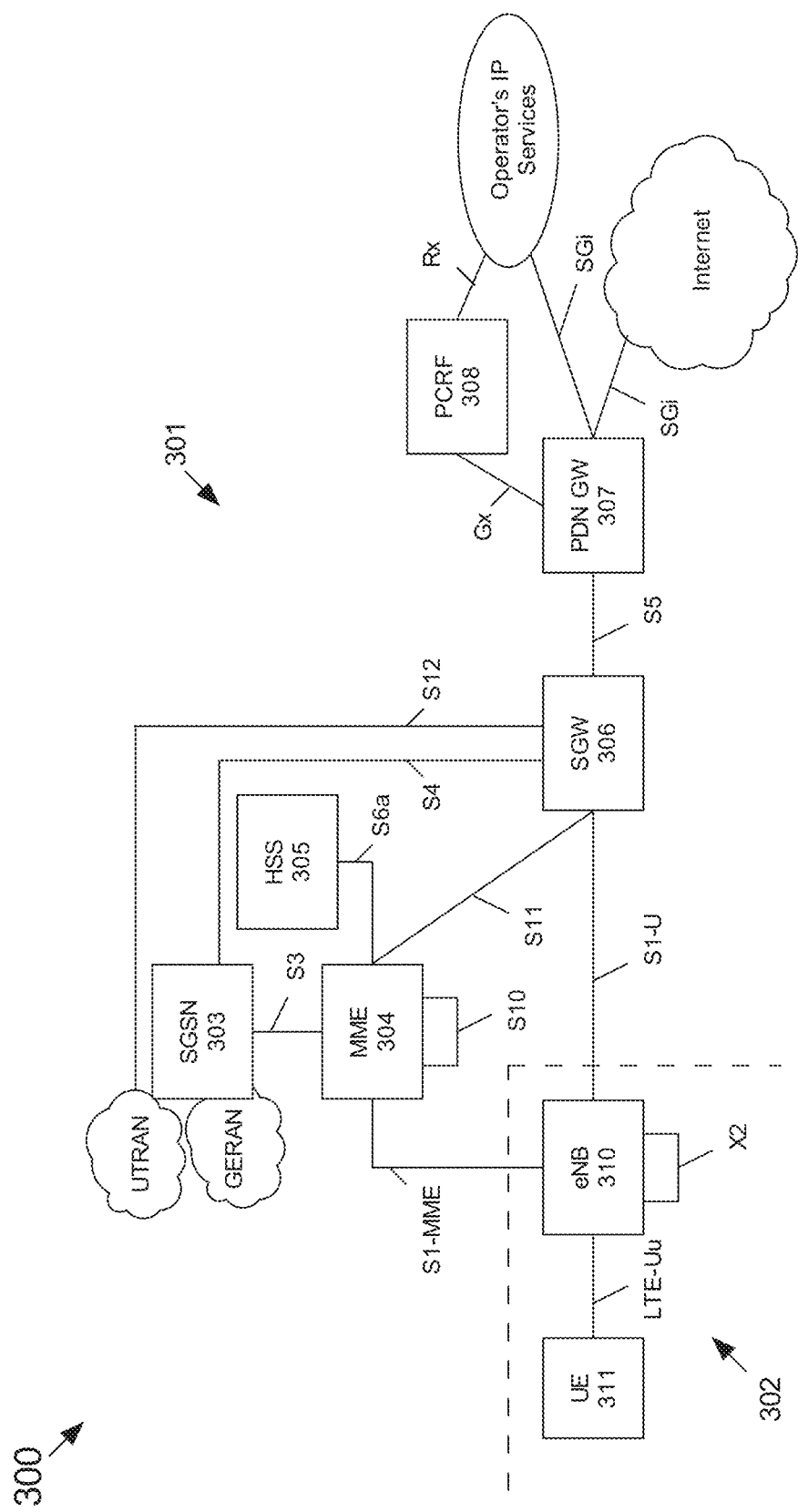
FIG. 3 shows a block diagram of the overall architecture of a 3GPP LTE network including network elements and standardized interfaces.

FIG. 3 shows a block diagram of the overall architecture of a 3GPP LTE network 300 that utilizes uplink power control coordination according to the subject matter disclosed herein.

FIG. 3 also generally shows network elements and standardized interfaces. At a high level, network 300 comprises a core network (CN) 301 (also referred to as the evolved Packet System (EPC)), and an air-interface access network E-UTRAN 302. CN 301 is responsible for the overall control of the various User Equipment (UE) connected to the network and establishment of the bearers. E-UTRAN 302 is responsible for all radio-related functions.

The main logical nodes of CN 301 include a Serving GPRS Support Node 303, the Mobility Management Entity 304, a Home Subscriber Server (HSS) 305, a Serving Gate (SGW) 306, a PDN Gateway 307 and a Policy and Charging Rules Function (PCRF) Manager 308. The functionality of each of the network elements of CN 301 is well known and is not described herein. Each of the network elements of CN 301 are interconnected by well-known standardized interfaces, some of which are indicated in FIG. 3, such as interfaces S3, S4, S5, etc., although not described herein.

While CN 301 includes many logical nodes, the E-UTRAN access network 302 is formed by one node, the evolved NodeB (base station (BS), eNB or eNodeB) 310, which connects to one or more User Equipment (UE) 311, of which only one is depicted in FIG. 3. UE 311 is also referred to herein as a wireless device (WD) and/or a subscriber station (SS). In one exemplary configuration, a single cell of an E-UTRAN access network 302 provides one substantially localized geographical transmission point (having multiple antenna devices) that provides access to one or more UEs. In another exemplary configuration, a single cell of an E-UTRAN access network 302 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 304 by an S1-MME interface and to SGW 306 by an S1-U interface. The protocols that run between the eNBs and the UEs are generally referred to as the "AS protocols." Details of the various interfaces are well known and not described herein.

The eNB 310 hosts the PHYsical (PHY). Medium Access Control (MAC), Radio Link Control (RLC), and Packet Data Control Protocol (PDCP) layers, which are not shown in FIG. 3, and which include the functionality of user-plane header-compression and encryption. The eNB 310 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 310 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 311, generates pages for UEs 311 over the air, broadcasts system information, controls UE measurement reporting, such as the periodicity of Channel Quality Information (CQI) reports, and allocates cell-level temporary identifiers to active UEs 311. The RRC layer also executes transfer of UE context from a source eNB to a target eNB during handover, and provides integrity protection for RRC messages. Additionally, the RRC layer is responsible for the setting up and maintenance of radio bearers.

Figure 4:
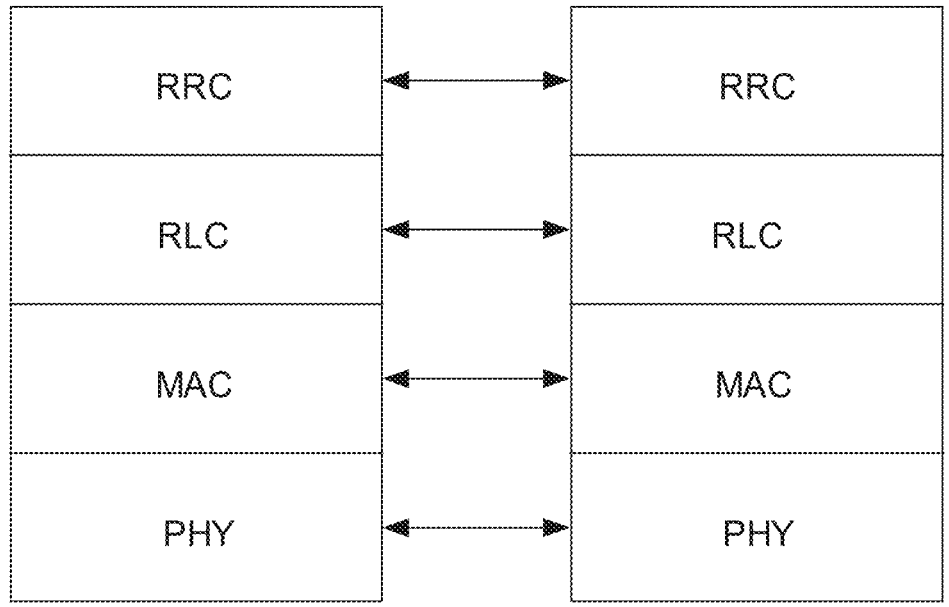
FIGS. 4 and 5 depict radio interface protocol structures between a UE and an eNodeB that are based on a 3GPP-type radio access network standard and that utilizes uplink power control coordination according to the subject matter disclosed herein.
Figure 5:
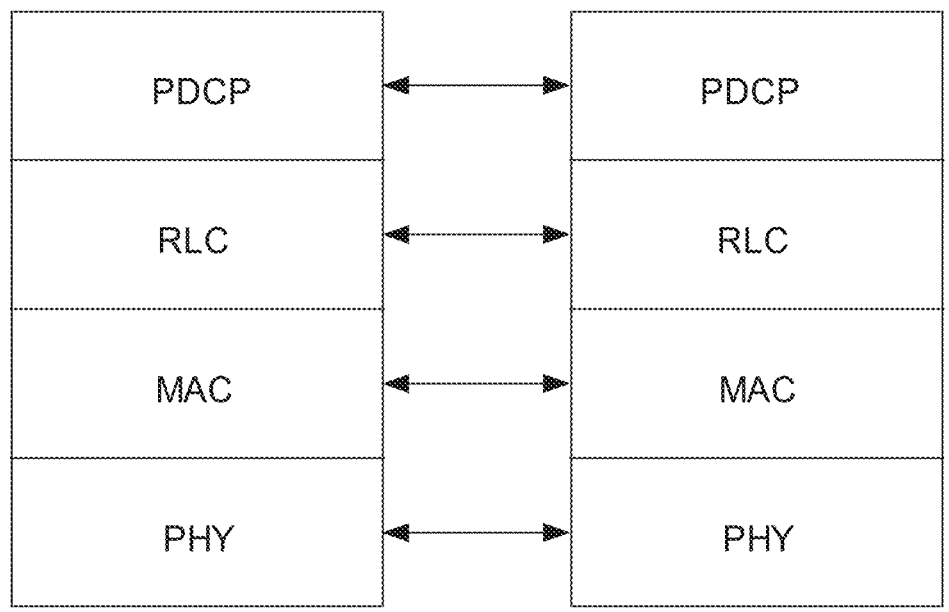

FIGS. 4 and 5 depict radio interface protocol structures between a UE and an eNodeB that are based on a 3GPP-type radio access network standard and that utilizes uplink power control coordination according to the subject matter disclosed herein. More specifically, FIG. 4 depicts individual layers of a radio protocol control plane and FIG. 5 depicts individual layers of a radio protocol user plane. The protocol layers of FIGS. 4 and 5 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver, is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Among the deployment scenarios considered by the Cooperative Multi-Point Transmission (CoMP) Study Item (SI) for LTE Rel. 11, CoMP SI Deployment Scenario 4 defines a network comprising low-power RRHs (Remote Radio Heads) within the coverage of a macro cell in which transmission/reception points have the same Cell IDs as the macro cell. For details, see 3GPP, NTT DOCOMO, RP-111125, "CoMP Simulation Assumptions," which is incorporated by reference herein.

Figure 6:
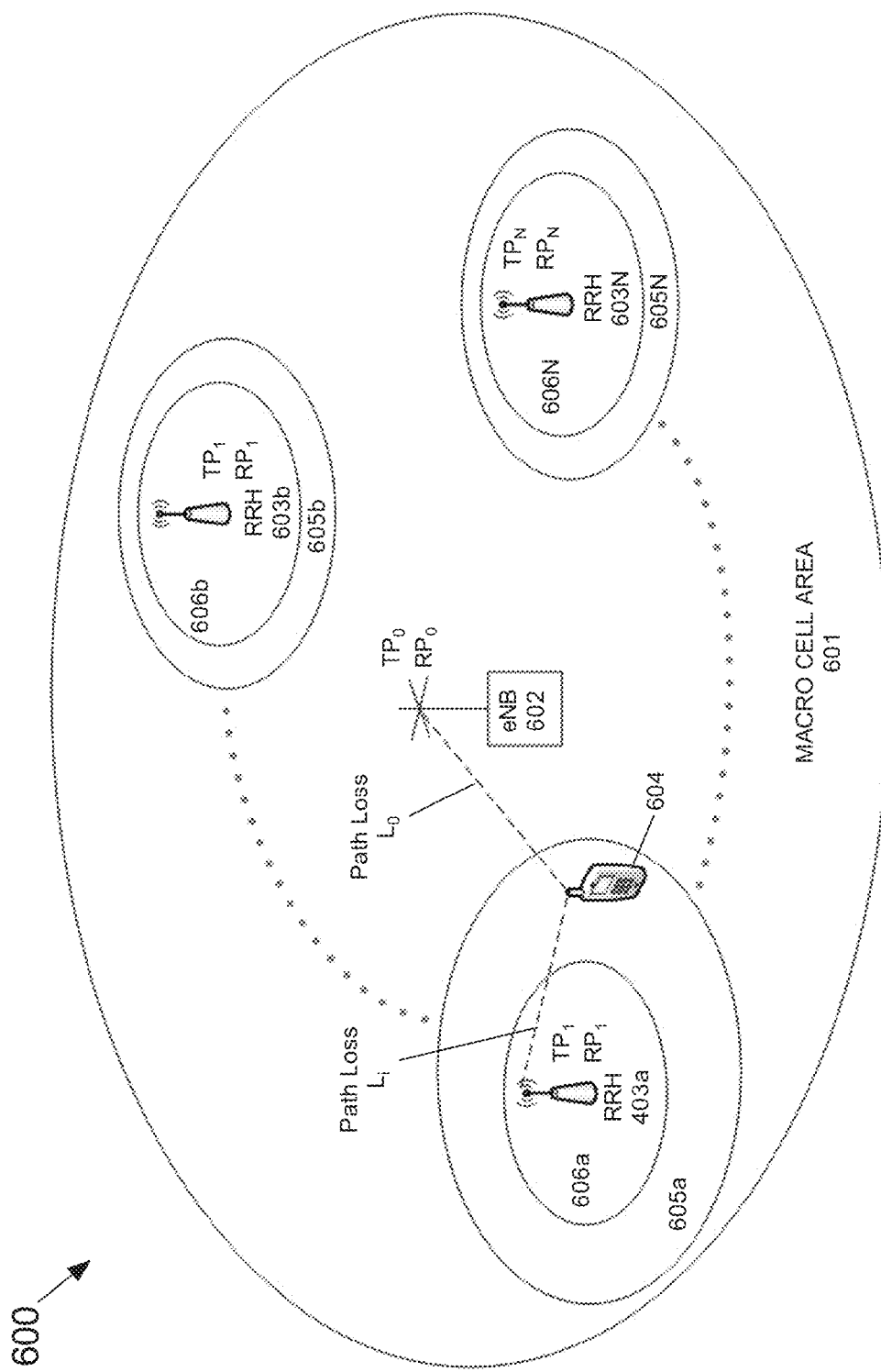
FIG. 6 depicts an exemplary arrangement 600 of the 3GPP LTE Rel. 11, Deployment Scenario 4 utilizing uplink power control coordination according to the subject matter disclosed herein.

FIG. 6 depicts an exemplary arrangement 600 of the 3GPP LTE Rel. 11. Deployment Scenario 4 utilizing uplink power control coordination according to the subject matter disclosed herein. Arrangement 600 comprises a macrocell area 601 comprising a macro base station (macro BS or macro eNB) 602, a plurality of RRHs 603a-603N and a User Equipment (UE) 604. RRHs 603a-603N are coupled to macro eNB 602 in a well-known manner, such as by an optical fiber link. Although only three RRHs 603a-603c and only a single UE 604 are depicted in FIG. 6, it should be understood that arrangement 600 could comprise a greater or fewer number of RRHs 603 and/or a greater number of EUs 604. For Deployment Scenario 4, macro base station (eNB) 602 is indexed with "0" as both a TP (Transmission Point) in the downlink and RP (Reception Point) in the uplink. The total number of low-power RRHs 603 within the macrocell area 601 with the same Cell ID as macro eNB 602 is N, and they are respectively indexed with ($TP_i$, $RP_i$) for downlink and uplink transmission. There are corresponding picocell uplink areas 605 and picocell downlink areas 606 in the vicinity of each RRH 603. While pico uplink areas 605 are depicted as being generally larger than a corresponding pico downlink areas 606, such may not necessarily the case in all situations depending on physical and/or propagation conditions. With respect to the exemplary arrangement of FIG. 6, additional modeling parameters, such as TxPower(0), TxPower(i), $L_i$, and TxPower(UE), are defined as follows:

TxPower(0) is defined herein as the transmission power of the eNB, which is 46/49 dBm in a 10/20 MHz carrier bandwidth, as defined in 3GPP RP-111125, "CoMP Simulation Assumptions. This parameter is also referred to herein as TxPower(eNB).

TxPower(i) for i=1 to N, is defined herein as the transmission power of a low-power $RRH_i$, for i=1 to N, 30 dBm (higher priority) as defined in 3GPP RP-111125, "CoMP Simulation Assumptions. It is assumed that each of the low-power RRHs have the same transmission power, that is, $$TxPower(i) = TxPower(RRH), i=1 \text{ to } N. \tag{1}$$

The transmission power of the eNB is expressed as $$TxPower(eNB) = TxPower(RRH) + TxDelta, \tag{2}$$

in which TxDelta is the transmission power difference between the eNB (the eNB could also be described as a high-power RRH) and a low-power RRH, which can be assumed to be equal to 16 dBm according to 3GPP RP-111125, "CoMP Simulation Assumptions.

Path loss $L_i$ is defined herein as the path loss (averaged by smoothing) from the macro eNB or from an RRH to a selected UE with approximate channel reciprocity being assumed, that is, the path loss is the same for both downlink and uplink transmission.

Lastly, TxPower(UE) is defined herein as the transmission power of the UE for uplink transmission.

For Deployment Scenario 4, a simplified situation is assumed for the downlink/uplink coverage. In particular, UE 604 respectively communicates with one TP for a downlink and one RP for an uplink. The strongest downlink received signal at UE 604 and the strongest uplink received signal at the RP side is adopted as a simple criterion for TP/RP selection. Specifically, the TP is selected based on the strongest downlink received signal at UE 604, that is, $$TP_{selected} = \max_{0 \leq i \leq N}(TxPower(i) - L_i). \tag{3}$$

Similarly, the RP is selected based on the strongest uplink received signal on eNB/RRH side, that is, $$RP_{selected} = \max_{0 \leq i \leq N}(TxPower(UE) - L_i). \tag{4}$$

According to the eNB/RRH transmission power, Equation (3) can be expressed as:

$$TP_{selected} = \max\left\{\begin{matrix} TxPower(eNB) - L_0, & i = 0 \\ TxPower(RRH) - L_i, & 1 \leq i \leq N \end{matrix}\right\}, \tag{5}$$

in which $L_0$ is the path loss between the UE and the macro eNB, and $L_i$ is the path loss between the UE and $RRH_i$. That is, the TP selection is determined based on the path loss and the eNB/RRH transmission power. Because the eNB has higher transmission power, and as expressed in Equation (2), Equation (5) can be written as:

$$TP_{selected} = \left\{\begin{matrix} TxPower(RRH) - (L_0 - TxDelta), & i = 0 \\ TxPower(RRH) - L_i, & 1 \leq i \leq n \end{matrix}\right\}. \tag{6}$$

Accordingly, $$TP_{selected} = \min\left\{\begin{matrix} L_0 - TxDelta, & i = 0 \\ L_i, & 1 \leq i \leq n \end{matrix}\right\}. \tag{7}$$

For RP selection, TxPower(UE) is a constant in Equation (4), therefore. Equation (4) can be transformed to be $$RP_{selected} = \min_{0 \leq i \leq N}(L_i). \tag{8}$$

In this simple criterion, the RP selection is fully determined based on the path loss from the UE to the RP and is not related to the UE uplink transmission power.

By comparing Equations (7) and (8), it can concluded that if the macro eNB is selected as the downlink TP (as described by Equation (7)), the following condition is met:

$$L_0 - TxDelta \leq L_i, \; 1 \leq i \leq N. \quad (9)$$

For the macro eNB to be selected as the uplink RP, however, the following condition must be met:

$$L_0 \leq L_i, \; 1 \leq i \leq N. \quad (10)$$

Accordingly, meeting the condition of Equation (9) does not guarantee the condition of Equation (10) is met. Another conclusion that can be made from Equations (7) and (8) is that if a low-power $RRH_x$ is selected as the downlink TP, as described by Equation (7), the following condition is met:

$$\begin{cases} L_x \leq L_0 - TxDelta, & i = 0 \\ L_x \leq L_i, & 1 \leq i \leq N, i \neq x. \end{cases} \quad (11)$$

The condition of Equation (11) can guarantee meeting the condition in Equation (12):

$$L_x = L_i, \; 0 \leq i \leq N, i \neq x, \quad (12)$$

Thus, $RRH_x$ is also selected as the uplink RP. Therefore, based on the explanation of the above simplified scenario, the downlink TPs and uplink RPs may not be same for a specific UE. Moreover, if a low-power RRH is selected as the downlink TP, that same RRH is also selected as the uplink RP. If, however, a low-power RRH is selected as the uplink RP, it cannot be guaranteed that the same RRH will be selected as the downlink TP because the low-power RRH has a larger uplink coverage than downlink coverage, which can be expressed as:

DownlinkCoverageArea(RRH) ⊂ UplinkCoverageArea(RRH). (13)

Further, if the macro eNB is selected as the uplink RP, it is also selected as the downlink TP. If, however, the macro eNB is selected as the downlink TP, it can not be guaranteed that the macro eNB will be selected as the uplink RP because the macro eNB has larger downlink coverage than uplink coverage, which can be expressed as:

DownlinkCoverageArea(eNB) ⊃ UplinkCoverageArea(eNB). (14)

Further still, these observations would continue hold for more than one TPs/RPs compared to the simple one TP/RP case as the TP/RP selection is highly related to the used uplink power-control scheme because (1) the uplink power-control scheme estimates a path loss value from the downlink reference signal(s), which is directly related to the TP selection; and (2) the uplink power-control scheme must meet a target of sufficient uplink signal quality while minimizing inter-cell and intra-cell interference, which is directly related to the RP selection at the eNB side.

A typical uplink power-control scheme that includes an open-loop component and a closed-loop component attempts to compensate for the path loss while minimizing interference. More specifically, the open-loop power-control component compensates for large-scale channel condition changes and is associated with a relatively low signaling overhead. The closed-loop power-control component, which is effected by downlink power adjustment commands, adjusts the transmission power level at a faster rate, but at a cost of greater signaling overhead. Path-loss estimation plays the most important role for the accuracy of the open-loop power-control component to support the Physical Uplink Control Channel (PUCCH), Physical Uplink Shared Channel (PUSCH), and Sounding Reference Signal (SRS) channel transmission. The mismatch of the path-loss estimate in comparison to an accurate (or actual) channel path-loss value can be compensated by the closed-loop power-control component (as mentioned) at the cost of higher signaling overhead. According to 3GPP, R1-110802, Alcatel-Lucent, "Further details of CoMP Scenarios for evaluation, especially Scenario 4," which is incorporated by reference herein, the path-loss estimation for uplink power control $PL_c$ is defined as the downlink path loss estimation for serving a cell c in dB calculated at the UE as:

$$PL_c = \text{referenceSignalPower} - \text{higher layer filtered RSRP}. \quad (15)$$

In Equation (15), referenceSignalPower is broadcasted by the eNB in PDSCH-ConfigCommon, which is a common value for all UEs in cell c. The Received Symbol Reference Powers (RSRPs) measured by using the received Common Reference Signal (CRS) and smoothed by the control factor filterCoefficient, which is included in UplinkPowerControlDedicated, can be configured to be a different value for each UE.

In Scenario 4, the path-loss estimation problem can be separated into two sub-problems: (1) obtaining a reliable RSRP measurement value; and (2) setting and communicating the useful referenceSignalPower for the UE. In Scenario 4, the RSRP measured value, calculated based on the downlink reference signal power from all TPs, can be expressed in linear scale as:

$$RSRP_{UE}^{Linear} = \frac{TxPower(eNB)^{Linear}}{L_0^{Linear}} + \sum_{i=1}^{N} \frac{TxPower(i)^{Linear}}{L_i^{Linear}}. \quad (16)$$

In the following, TxPower of the eNB and RRHs, as well as reference signal selection, are considered. It is noted that for facilitating the explanation, legacy UEs (for backward compatibility) and new UEs (for more accurate estimation and better performance) will be considered separately. Additionally, reference signals sent by the eNB/RRHs, such as CRS, will be also considered accordingly.

The total uplink received signal from all RPs can be expressed as:

$$UplinkSumRxSignal_{UE}^{Linear} = \sum_{i=0}^{N} \frac{TxPower(UE)^{Linear}}{L_i^{Linear}}. \quad (17)$$

The accurate (or actual) uplink path loss for uplink power control can be expressed by the ratio of the UE transmission power to the uplink received signal power (see Equation (17)) as:

$$L_{UE}^{Linear} = \frac{TxPower(UE)^{Linear}}{UplinkSumRxSignal_{UE}^{Linear}}. \quad (18)$$

Accordingly, it follows that $$\frac{1}{L_{UE}^{Linear}} = \sum_{i=0}^{N} \frac{1}{L_i^{Linear}}, \quad (19)$$

in which $10 \log_{10}(L_{UE}^{Linear})$ is the accurate (or real) uplink path-loss value in dB, which is estimated by using downlink reference signals, as described in Equation (16).

For legacy UEs, the RSRP measurement is based on CRS with only one broadcasted referenceSignalPower being used as a reference. Note that the calculation is defined in Equation (15). Three possible situations are considered for CRS configuration for Scenario 4. In the first situation, CRS is transmitted from the macro eNB only. In the second situation, CRS is simultaneously transmitted from the macro eNB and all RRHs. In the third situation, CRS is transmitted from the macro cell and a subset of the RRHs.

For the first situation in which CRS is transmitted from the macro eNB only, the measured RSRP value (as derived from Equation (16)) can be expressed as:

$$RSRP_{UE}^{Linear} = \frac{TxPower(eNB)^{Linear}}{L_0^{Linear}}. \quad (20)$$

In this case, referenceSignalPower can be only defined as the CRS transmission power at the macro eNB and the estimated path-loss value is $$L_{Estimated}^{dB} = F(L_0^{dB}). \quad (21)$$

in which function $F(L_0^{dB})$ is a smoothing filter controlled by the UE-specific parameter filterCoefficient.

Comparing Equations (21) and (19), the path-loss estimation target is $$L_{UE}^{dB} \approx L_{UE}^{dB} \quad (22)$$

and can be met only if the following condition is met:

$$\frac{1}{L_0^{dB}} \gg \sum_{i=1}^{N} \frac{1}{L_i^{Linear}}. \quad (23)$$

Note that Equation (23) can be rewritten as:

$$\frac{TxPower(UE)^{Linear}}{L_0^{Linear}} \gg \sum_{i=1}^{N} \frac{TxPower(UE)^{Linear}}{L_i^{Linear}}, \quad (24)$$

in which $$\frac{TxPower(UE)^{Linear}}{L_0^{Linear}}$$

is the uplink received signal power of the UE at the eNB, and $$\sum_{i=1}^{N} \frac{TxPower(UE)^{Linear}}{L_i^{Linear}}$$

is the sum of the uplink received signal power of the UE at all RRHs. Equation (24) can be further transformed by defining an additional threshold parameter OLPC_Threshold$^{dB}$ as follows:

$$UplinkRxSignal_{UE}^{dB}(eNB) \geq UplinkSumRxSignal_{UE}^{dB}(RRH) + OLPC\_Threshold^{dB}. \quad (25)$$

Thus, for legacy UEs, if CRS is transmitted from the macro eNB only, the uplink Open-Loop Power Control (OLPC) for a legacy UE is enabled only if the macro eNB receives the uplink signal from the legacy UE having a greater power than the sum of the uplink received signal power from the legacy UE at all RRHs, i.e., the condition defined by Equation (25). Additionally, for legacy UEs, if the condition of Equation (25) is met, the OLPC (path-loss estimation and compensation) should be disabled to avoid higher Closed-Loop Power Control (CLPC) signal overhead for additional compensation of the path-loss estimation error. Because a legacy UE has no way to explicitly disable the OLPC, the only implicit way is to set the maximum filter coefficient defined by filterCoefficient (which is included in UplinkPowerControlDedicated), and can be configured as a different value for each UE. If CRS is transmitted from the macro eNB only and the condition in Equation (25) cannot be met, the macro eNB can configure legacy UEs with maximum filter coefficient defined by filterCoefficient, (which is included in UplinkPowerControlDedicated). According to Equation (20), in the situation in which the CRS is transmitted from the macro eNB only, referenceSignalPower can only be defined as the CRS transmission power at the macro eNB. If the CRS is transmitted from the macro eNB only, referenceSignalPower can be only defined as the CRS transmission power at the macro eNB.

For the second situation in which CRS is transmitted simultaneously from the macro eNB and all RRH, the RSRP measured by a legacy UE can be derived from Equation (16) as:

$$RSRP_{UE}^{Linear} = \frac{TxPower(eNB)^{Linear}}{L_0^{Linear}} + \sum_{i=1}^{N} \frac{TxPower(RRH)^{Linear}}{L_0^{Linear}} \quad (26)$$

$$RSRP_{UE}^{Linear} = \frac{TxPower(eNB)^{Linear} - TxPower(RRH)^{Linear}}{L_0^{Linear}} + TxPower(RRH)^{Linear} \sum_{i=0}^{N} \frac{1}{L_i^{Linear}}. \quad (27)$$

Based on Equation (19), $$RSRP_{UE}^{Linear} = \quad (28)$$

$$\frac{TxPower(eNB)^{Linear} - TxPower(RRH)^{Linear}}{L_0^{Linear}} + \frac{TxPower(RRH)^{Linear}}{L_{UE}^{Linear}},$$

in which $L_{UE}^{Linear}$ is the accurate (or actual) uplink path loss, $L_0^{Linear}$ is the path loss from the UE to the macro eNB. TxPower(eNB)$^{Linear}$ is the transmission power of the eNB, and TxPower(RRH)$^{Linear}$ is the transmission power of the RRH.

Based on Equation (28), if the CRS transmission power is equal at the eNB and at the RRH, i.e., $$TxPower(eNB)^{Linear} = TxPower(RRH)^{Linear},$$

a legacy UE can obtain accurate path-loss estimation from the CRS, and referenceSignalPower is set as the transmission power of CRS from one eNB/RRH. If the CRS transmission power is unequal at the macro eNB and the RRH in which, in the general case, the macro eNB has a much greater power than the RRH, $$TxPower(eNB)^{Linear} \gg TxPower(RRH)^{Linear}. \quad (29)$$

If referenceSignalPower is set as the CRS transmission power of the macro eNB, the estimated pathloss obtained from referenceSignalPower is:

$$L_{estimated}^{dB} = referenceSignalPower - RSRP_{Ue}^{dB}.$$

Then, we can get:

$$\frac{1}{L_{Estimated}^{Linear}} = \frac{RSRP_{UE}^{Linear}}{TxPower(eNB)^{Linear}}. \quad (30)$$

Similarly, if the condition of Equation (25) is met (that is, if a UE is very close to the eNB), $$L_{Estimated}^{dB} \approx F(L_0^{dB}) \approx L_{UE}^{dB}.$$

Otherwise, if the condition of Equation (25) is not met, using Equations (28) and (30):

$$\frac{1}{L_{Estimated}^{Linear}} = \frac{\left(\frac{TxPower(eNB)^{Linear} - TxPower(RRH)^{Linear}}{TxPower(eNB)^{Linear}}\right)}{L_0^{Linear}} - \frac{\left(\frac{TxPower(RRH)^{Linear}}{TxPower(eNB)^{Linear}}\right)}{L_{UE}^{Linear}}. \quad (31)$$

Because of the condition in Equation (29), $$\frac{1}{L_{Estimated}^{Linear}} \approx \frac{1}{L_0^{Linear}} + \frac{\left(\frac{TxPower(RRH)^{Linear}}{TxPower(eNB)^{Linear}}\right)}{L_{UE}^{Linear}}. \quad (32)$$

Similarly, if the value of $$\frac{1}{L_0^{Linear}}$$

in Equation (32) is ignored, the following condition must be met:

$$\frac{\left(\frac{TxPower(RRH)^{Linear}}{TxPower(eNB)^{Linear}}\right)}{L_{UE}^{Linear}} > \frac{1}{L_0^{Linear}}. \quad (33)$$

The threshold parameter $OLPC\_Threshold^{dB}$ can also be used to transform the condition of Equation (33) from implicit into explicit, and at the same time transform into the uplink received signal power:

$$(TxPower(RRH)^{dB} - TxPower(eNB)^{dB}) + UplinkSumRxSignal_{UE}^{dB}(All) \geq UplinkRxSignal_{UE}^{dB}(eNB) + OLPC\_Threshold^{dB}.$$

By using Equation (2), the equation directly above can be simplified to be:

$$TxDelta + UplinkSumRxSignal_{UE}^{dB}(All) \geq UplinkRxSignal_{UE}^{dB}(eNB) + OLPC\_Threshold^{dB}. \quad (34)$$

If the condition of Equation (34) is met, Equation (32) can be simplified to be:

$$L_{Estimated}^{dB} \approx L_{UE}^{dB} + TxDelta. \quad (35)$$

Therefore, if referenceSignalPower is set as the transmission power of the CRS at the macro eNB, and the UE is connected to the RRHs for uplink transmission, the estimated path loss by the CRS is greater than the accurate (or actual) path loss by TxDelta (the fixed power difference between the macro eNB and a low-power RRH), which results in higher transmission power at the UE—at least in the initial stage. Because the difference TxDelta is a fixed value that can be easily compensated by the CLPC component, the OLPC (based on the path-loss estimation) can still be enabled in order to compensate for the large-scale fluctuation of the accurate (or actual) uplink path loss and reduce the usage of CLPC.

If referenceSignalPower is set as the transmission power of the CRS at the RRH, the situation is reversed: If the UE is connected to the RRHs for uplink transmission, the estimated path loss by the CRS will be accurate, but if the UE is connected to the eNB for uplink transmission, the estimated path loss is smaller than the accurate (or real) path loss by TxDelta—at least in the initial stage. Because the lack of sufficient transmission power is generally a worse condition than a greater power than necessary condition, in the case the CRS transmitted by the eNB and RRHs simultaneously, the referenceSignalPower should be set as the CRS transmission power at the eNB.

Thus, if the CRS is simultaneously transmitted from the macro cell and the RRHs, the referenceSignalPower should be defined as the transmission power at the eNB. The uplink OLPC of a legacy UE is enabled only if the macro eNB meets either of the condition defined in Equation (25) or the condition defined in Equation (34). If neither of the conditions in Equations (25) and (34) are met, the uplink OLPC of a legacy UE is disabled implicitly by setting the legacy UE with maximum filter coefficient defined by filterCoefficient (which is included in UplinkPowerControlDedicated).

Compared to the situation in which the CRS is transmitted by only the macro eNB, the simultaneous transmission of the CRS by the macro eNB and the RRHs has a larger coverage area. Thus, for a legacy UE, simultaneously transmitting CRS from the macro eNB and the RRHs leads to better coverage as compared to the situation in which the CRS is transmitted by the macro eNB only.

The situation in which the CRS is transmitted from the macro eNB and a subset of the RRHs is a state that is between the macro eNB only transmitting the CRS and the simultaneous transmission of the CRS by the macro eNB and the RRHs. Similar observations can be made in this situation in which is a clear definition of the subset of the RRHs also transmitting the CRS.

FIG. 5 depicts a CoMP SI Deployment Scenario 4 signal processing diagram for legacy UEs according to the subject matter disclosed herein. Processing is executed separately at the macro eNB and at the UE. At the macro eNB, the macro eNB measures and monitors the legacy UE's uplink channel (PUSCH, PUCCH, SRS) received signal strength at the macro eNB and at each RRH. Based on the measurement values of the uplink received signal strength, the eNB determines the filter Coefficient value setting as:

---

If (CRS is transmitted from the macro cell):
   If (the condition in Equation (25) is met)
      filterCoefficient is set to thet maximum value(19);
   Else
      filterCoefficient is set to the default value(4).
if (CRS is transmitted simultaneously from the macro eNB and all RRHs):
   if (the condition in Equation (25) or Equation (34) is met,
      filterCoefficient is set to the maximum value (Equation (19));
   Else
      filterCoefficient is set to the default value (Equation (4)).

---

The information element Uplink PowerControlDedicated (includes the updated filterCoefficient field) is then unicast to a legacy UE. In the broadcast channel, the macro eNB sends the information element PDSCH-ConfigCommon (includes the field referenceSignalPower): The field "referenceSignalPower" is set to the CRS transmission power of the macro cell only for both if the CRS is transmitted by macro cell only and if the CRS is transmitted simultaneously by the macro eNB and RRHs.

At the legacy UE side, the legacy UE measures the received CRS RSRP as defined in 3GPP, TS36.214, V10.1.0, "Physical layer; Measurements," which is incorporated by reference herein. The legacy UE applies the filter to the received RSRP as defined in 3GPP, TS36.214, V10.1.0, "Radio Resource Control (RRC); Protocol specification," which is incorporated by reference herein, as $$F_n = (1-a) \cdot F_{n-1} + a \cdot M_n,$$

in which, $$a = \frac{1}{2^{k/4}}$$

and k is the filterCoefficient value. Then, the legacy UE estimates the path loss by using Equation (15), which is defined in 3GPP, R1-110802, Alcatel-Lucent, "Further details of CoMP Scenarios for evaluation, especially Scenario 4," which is incorporated by reference herein. After the legacy UE estimates the path loss, the legacy UE follows the definition in 3GPP, TS36.213, V10.0.1, "Physical Layer Procedures," which is incorporated by reference herein, to decide the uplink transmission power for the different uplink channels (PUSCH, PUCCH, and SRS).

For Rel. 11 UEs, path-loss measurement is more flexible than for a legacy UE. A Rel. 11 EU can use not only the CRS, but other reference downlink signals, such as the CSI-RS (Channel State Information-Reference Signal). Alternatively or additionally, more than only one broadcasted referenceSignalPower can be used as reference or a dedicated referenceSignalPower can be sent to the UE.

In the situation in which the CRS is transmitted from the macro eNB only, a Rel. 11 UE can measure the RSRP from the CRS according to:

$$RSRP_{UE}^{Linear}(CRS) = \frac{TxPower(eNB)^{Linear}}{L_0^{Linear}}. \qquad (36)$$

Then, the Rel. 11 UE can estimate the path loss to the eNB by only using the CRS as $$L_0^{dB}(\text{Estimated}) = TxPower(eNB)^{dB} - F(RSRP_{UE}^{dB}(CRS)) \qquad (37)$$

in which $F(RSRP_{UE}^{dB}(CRS))$ is the smoothing filter. (See, also, Equation (21)).

The path-loss estimation to a low-power RRH can be done by using the CSI-RS:

$$L_i^{dB}(\text{Estimated}) = TxPower(RRH)^{dB} - F(RSRP_{UE}^{dB}(CSI\text{-}RS(i))), \qquad (38)$$

in which $RSRP_{UE}^{dB}(CSI\text{-}RS(i))$ is the RSRP value that is measured based on the CSI-RS port i, which is set for low-power RRHs. The uplink path-loss estimated value for the UE can be combined from Equations (37) and (38) (transformed from dB to linear scale):

$$\frac{1}{L_{UE}^{Linear}(\text{Estimated})} = \frac{1}{L_0^{Linear}(\text{Estimated})} + \sum_{i=1}^{N} \frac{1}{L_i^{Linear}(\text{Estimated})}. \qquad (39)$$

Thus, if the CRS is transmitted from the macro eNB only, a Rel. 11 UE can estimate the path loss to the macro eNB and to the low-power RRHs separately by using CRS and CSI-RS, and then combine the result to obtain a more accurate estimation of the uplink path-loss for OLPC. Alternatively, a Rel. 11 UE can be informed by the RRC for the CSI-RS ports used for path-loss estimation depending on the RPs selection for the UE. Further, both macro eNB transmission power and RRH transmission power needs to be broadcasted to the UE for uplink path-loss estimation, or the transmission power of the CSI-RS ports needs to be unicasted to the UE for uplink path-loss estimation.

If the CRS is transmitted simultaneously from the macro cell and all RRHs, the RSRP can be measured by a Rel. 11 UE as $$RSRP_{UE}^{Linear}(CRS) = \qquad (40)$$
$$\frac{TxPower(eNB)^{Linear} - TxPower(RRH)^{Linear}}{L_0^{Linear}} + \frac{TxPower(RRH)^{Linear}}{L_{UE}^{Linear}}.$$

If an accurate estimation of $L_{UE}^{Linear}$ from Equation (40) is desired, the UE needs to know (1) the eNB transmission power $TxPower(eNB)^{Linear}$ (or its dB value) and the low-power RH transmission $TxPower(RRH)^{Linear}$ (or its dB value) for the CRS, and (2) the estimated path loss to eNB $L_0^{Linear}$ (or its dB value). The CRS transmission power of the eNB and the low-power RRHs can be transmitted to the UE. For legacy UEs, the CRS transmission power of the eNB has already been indicated by referenceSignalPower included in PDSCH-ConfigCommon; therefore, only the CRS power of the low-power RRH needs to be broadcast as additional reference signal power information. The path loss from the UE to the macro eNB can be estimated by macro eNB downlink reference signals only, for example, by using the CSI-RS ports defined for the macro cell only:

$$L_0^{dB}(\text{Estimated}) = TxPower(eNB)^{dB} - F(RSRP_{UE}^{dB}(CSI\text{-}RS(x))), \qquad (41)$$

in which $RSRP_{UE}^{dB}(CSI\text{-}RS(x))$ is the RSRP value measured from CSI-RS port x that is assigned to the eNB only. Then, $$L_{UE}^{dB} = TxPower(RRH)^{dB} - 10 \log_{10}(RSRP_{UE}^{Linear}(CRS) - \frac{TxPower(eNB)^{Linear} - TxPower(RRH)^{Linear}}{L_0^{Linear}(\text{Estimated})}. \quad (42)$$

The result of Equation (42) must be smoothed by a filter to obtain the estimated path-loss value:

$$L_{UE}^{dB}(\text{Estimated}) = F(L_{UE}^{dB}). \quad (43)$$

Compared to the situation in which CRS sent by the macro eNB only, this estimation process is much simpler because only the RSRP by the CRS needs to be measured in order to estimate the path loss from the UE to the eNB. Accordingly, for uplink power control for Rel. 11 UEs, simultaneously transmitting CRS from the macro cell and all RRHs simultaneously provides better coverage (better performance) than the CRS transmitted by the macro eNB only.

FIG. 6 depicts a CoMP S1 Deployment Scenario 4 signal processing diagram for Rel. 11 UEs according to the subject matter disclosed herein. Processing is executed separately at the macro eNB and at the UE. From the eNB side, the eNB sends in the broadcast channel the modified information element PDSCH-ConfigCommon (which includes the field reference SignalPowerCRS, referenceSignalPowerRRH and referenceSignalPowerMacro). If both the CRS is transmitted only by the macro eNB and the CRS is simultaneously transmitted by the macro eNB and the RRHs, "referenceSignalPowerCRS" is set to the CRS transmission power of macrocell only, which is used by legacy UEs. If there is no CRS transmission from the RRHs, "referenceSignalPowerRRH" is set to be lowest value. The field "referenceSignalPowerMacro" is set to the macrocell only reference signal power with an alternative being the CSI-RS port only for the macrocell. The new PDSCH-ConfigCommon can be defined by the following exemplary psuedocode:

```
PDSCH-ConfigCommon ::= Sequence (
    referenceSignalPowerCRS      Integer (-60...50),
    p-b                           Integer(0...3),
    referenceSignalPowerRRH      Integer (-60...50)
    referenceSignalPowerMacro    Integer (-60...50)
)
```

On the UE side, the UE measures the received CRS RSRP as defined in 3GPP, TS36.214, V10.1.0, "Physical layer; Measurements," which is incorporated by reference herein. The UE measures the macrocell only reference signal power RSRP with an alternative being measurement of the macro cell only CSI-RS port. Then, the UE estimates the path loss as follows:

The UE calculates the path loss from the UE to the macro eNB using Equation (41). The instant path loss in the uplink is then calculated by using Equation (42). Lastly, the instant path-loss value is smoothed by using the filter of Equation (43). For a legacy UE, after the legacy UE estimates the path loss, it follows the definition in 3GPP, TS36.213, V10.0.1. "Physical Layer Procedures," which is incorporated by reference herein, to decide the uplink transmission power for the different uplink channels (PUSCH, PUCCH, and SRS).

According to the subject matter disclosed herein, for all CRS transmission cases (i.e., transmission by the macro eNB only, simultaneous transmission by the macro eNB and all RRHs, and simultaneous transmission by the macro eNB and a subset of all RRHs), the value of referenceSignalPower field in the PDSCH-ConfigCommon information element should be set to be the transmission power of the macro eNB. Accordingly, simultaneously transmitting CRS from the macro eNB and all of the low-power RRHs provides the best uplink power control for both legacy and Rel. 11 UEs.

For legacy UEs, the OLPC (obtained by path loss estimation) can be enabled and disabled implicitly by setting the filterCoefficient field that is included in UplinkPowerControlDedicated in formation element. If the CRS is transmitted from the eNB only, the OLPC is enabled if the condition in Equation (25) is met, and the OLPC is disabled if the condition in Equation (25) is not met. If the CRS is simultaneously transmitted from the macro eNB and the RRHs, the OLPC is enabled if either of the conditions in Equations (25) or (34) is met. The OLPC is disabled if the conditions in Equations (25) and (34) are not met. Alternatively, the macro eNB can set the value of filterCoefficient information element based on the measurement of the uplink received signal strength at the macro cell and each RRH.

OLPC based on path loss estimation can be performed by Rel. 11 UEs if the transmission power of low-power RRHs is broadcasted as an additional reference signal power information. Alternatively, if the CRS is transmitted from the eNB only, OLPC based on path loss estimation for Rel. 11 UEs can be performed based on the eNB informing the UE using the CSI-RS ports, which includes the CSI-RS port transmission power.

FIG. 7 depicts functional block diagram of an information-handling system 700 that utilizes uplink power control coordination according to the subject matter disclosed herein. Information-handling system 700 of FIG. 7 may tangibly embody one or more of any of the network elements of core network 300 as shown in and described with respect to FIG. 3. For example, information-handling system 700 may represent the hardware of eNB 310 and/or UE 311, with greater or fewer components depending on the hardware specifications of the particular device or network element. Although information-handling system 700 represents one example of several types of computing platforms, information-handling system 700 may include more or fewer elements and/or different arrangements of elements than shown in FIG. 7, and the scope of the claimed subject matter is not limited in these respects.

Information-handling system 700 may comprise one or more processors, such as processor 710 and/or processor 712, which may comprise one or more processing cores. One or more of processor 710 and/or processor 712 may couple to one or more memories 716 and/or 718 via memory bridge 714, which may be disposed external to processors 710 and/or 712, or alternatively at least partially disposed within one or more of processors 710 and/or 712. Memory 716 and/or memory 718 may comprise various types of semiconductor-based memory, for example, volatile-type memory and/or non-volatile-type memory. Memory bridge 714 may couple to a graphics system 720 to drive a display device (not shown) coupled to information handling system 700.

Information-handling system 700 may further comprise input/output (I/O) bridge 722 to couple to various types of I/O systems. I/O system 724 may comprise, for example, a universal serial bus (USB) type system, an IEEE-1394-type system, or the like, to couple one or more peripheral devices to information-handling system 700. Bus system 726 may comprise one or more bus systems, such as a peripheral component interconnect (PCI) express type bus or the like, to connect one or more peripheral devices to information-handling system 700. A hard disk drive (HDD) controller system 728 may couple one or more hard disk drives or the like to information handling system, for example, Serial ATA type drives or the like, or alternatively a semiconductor based drive comprising flash memory, phase change, and/or chalcogenide type memory or the like. Switch 730 may be utilized to couple one or more switched devices to I/O bridge 722, for example Gigabit Ethernet type devices or the like. Furthermore, as shown in FIG. 7, information-handling system 700 may include a radio-frequency (RF) block 732 comprising RF circuits and devices for wireless communication with other wireless communication devices and/or via wireless networks, such as core network 300 of FIG. 3, for example, in which information-handling system 700 embodies base station 314 and/or wireless device 316, although the scope of the claimed subject matter is not limited in this respect. In one or more embodiments, information-handling system could comprise a macro eNB, a RRH, a legacy UE, a Rel. 11 UE, or a wireless device.

FIG. 8 depicts a functional block diagram of a wireless local area or cellular network communication system 800 depicting one or more network devices utilizing uplink power control coordination according to the subject matter disclosed herein. In the communication system 800 shown in FIG. 8, a wireless device 810 may include a wireless transceiver 812 to couple to an antenna 818 and to a processor 814 to provide baseband and media access control (MAC) processing functions. In one or more embodiments, wireless device 810 may be a legacy UE, a Rel. 11 UE, a wireless device (WD), a cellular telephone, an information-handling system, such as a mobile personal computer or a personal digital assistant or the like, that incorporates a cellular telephone communication module, although the scope of the claimed subject matter is not limited in this respect. Processor 814 in one embodiment may comprise a single processor, or alternatively may comprise a baseband processor and an applications processor, although the scope of the claimed subject matter is not limited in this respect. Processor 814 may couple to a memory 816 that may include volatile memory, such as dynamic random-access memory (DRAM), non-volatile memory, such as flash memory, or alternatively may include other types of storage, such as a hard disk drive, although the scope of the claimed subject matter is not limited in this respect. Some portion or all of memory 816 may be included on the same integrated circuit as processor 814, or alternatively some portion or all of memory 816 may be disposed on an integrated circuit or other medium, for example, a hard disk drive, that is external to the integrated circuit of processor 814, although the scope of the claimed subject matter is not limited in this respect.

Wireless device 810 may communicate with access point 822 via wireless communication link 832, in which access point 822 may include at least one antenna 820, transceiver 824, processor 826, and memory 828. In one embodiment, access point 822 may be a macro eNB, a RRH, a base station of a cellular telephone network, and in an alternative embodiment, access point 822 may be an access point or wireless router of a wireless local or personal area network, although the scope of the claimed subject matter is not limited in this respect. In an alternative embodiment, access point 822 and optionally mobile unit 810 may include two or more antennas, for example, to provide a spatial division multiple access (SDMA) system or a multiple-input-multiple-output (MIMO) system, although the scope of the claimed subject matter is not limited in this respect. Access point 822 may couple with network 830 so that mobile unit 810 may communicate with network 830, including devices coupled to network 830, by communicating with access point 822 via wireless communication link 832. Network 830 may include a public network, such as a telephone network or the Internet, or alternatively network 830 may include a private network, such as an intranet, or a combination of a public and a private network, although the scope of the claimed subject matter is not limited in this respect. Communication between mobile unit 810 and access point 822 may be implemented via a wireless local area network (WLAN), for example a network compliant with a an Institute of Electrical and Electronics Engineers (IEEE) standard, such as IEEE 802.11a, IEEE 802.11b, HiperLAN-II, and so on, although the scope of the claimed subject matter is not limited in this respect. In another embodiment, communication between mobile unit 810 and access point 822 may be at least partially implemented via a cellular communication network compliant with a Third Generation Partnership Project (3GPP or 3G) standard, although the scope of the claimed subject matter is not limited in this respect. In one or more embodiments, antenna 818 may be utilized in a wireless sensor network or a mesh network, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. The claimed subject matter will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    transmitting a reference signal from a base station device to at least one wireless device within a macro cell in a wireless network, wherein the base station device and at least one radio transmitter device communicatively coupled to and remote from the base station device are disposed within the macro cell, the base station device and one or more radio transmitter devices being a transmission point, or a reception point, for one or more wireless devices within the cell;
    transmitting to the at least one wireless device information relating to a transmission power of the base station device;
    measuring at the base station device a received strength of the uplink signal from the at least one wireless device;
    determining a filter coefficient value based at least in part on the received strength of the uplink signal, wherein the filter coefficient is set to a maximum value if a strength of the uplink signal at the base station device is greater than or equal to a total strength of the uplink signal at one or more radio transmitter devices plus a threshold, otherwise the filter coefficient is set to a default value;
    transmitting the filter coefficient value for received strength measurement to the at least one wireless device;
    receiving from the at least one wireless device an uplink signal containing information relating to an uplink power determination that is based on the reference signal and the information relating to the transmission power of the base station device, wherein the uplink power determination is based at least in part on a path loss estimation that is smoothed with a filter using the filter coefficient value.

2. The method according to claim 1, further comprising simultaneously transmitting the reference signal from the base station device and at least one radio transmitter device.

3. The method according to claim 2, wherein simultaneously transmitting comprises simultaneously transmitting the reference signal from the base station device and a plurality of radio transmitter devices within the cell.

4. The method according to claim 1, wherein the information relating to the transmission power of the base station device comprises the transmission power of the base station device.

5. The method according to claim 1, wherein the value of the filter coefficient disables an open-loop power control function in the at least one wireless device.

6. The method according to claim 1, further comprising transmitting to the at least one wireless device information relating to a reference signal of the macro cell.

7. A method, comprising:
receiving at a wireless device a reference signal transmitted from a base station device within a macro cell in a wireless network, wherein the base station device and at least one radio transmitter device being communicatively coupled to and remote from the base station device are disposed within the macro cell, the base station device and one or more radio transmitters devices being a transmission point, or a reception point, for the one or more wireless devices within the cell;
receiving at least one wireless device information relating to a transmission power of the base station device;
receiving from the base station device a filter coefficient value for a signal power measurement made by the wireless device, wherein the filter coefficient is set to a maximum value if a strength of the uplink signal at the base station device is greater than or equal to a total strength of the uplink signal at one or more radio transmitter devices plus a threshold, otherwise the filter coefficient is set to a default value;
performing path loss estimation and smoothing the path loss estimation with a filter using the filter coefficient value;
determining a transmission point for the wireless device within the macro cell; and
transmitting from the wireless device an uplink signal containing information relating to an uplink power determination that is based on the received reference signal and the received information relating to the transmission power of the base station device, wherein the uplink power determination is based at least in part on the path loss estimation.

8. The method according to claim 7, wherein the reference signal is simultaneously transmitted from the base station device and at least one radio transmitter device.

9. The method according to claim 8, wherein the reference signal is simultaneously transmitted from the base station device and a plurality of radio transmitter devices within the cell.

10. The method according to claim 7, wherein the information relating to the transmission power of the base station device comprises the transmission power of the base station device.

11. The method according to claim 7, wherein the value of the filter coefficient disables an open-loop power control function of the wireless device.

12. The method according to claim 7, further comprising receiving from the base station device information relating to a reference signal of the macro cell.

13. A base station, comprising:
at least one radio-frequency transceiver; and
a processor coupled to the at least one radio-frequency transceiver, the processor configured to:
transmit a reference signal to at least one wireless device within a macro cell in a wireless network;
transmit to the at least one wireless device information relating to a transmission power;
measure at the base station device a received strength of the uplink signal from the at least one wireless device;
determine a filter coefficient value based at least in part on the received strength of the uplink signal, wherein the filter coefficient is set to a maximum value if a strength of the uplink signal at the base station device is greater than or equal to a total strength of the uplink signal at one or more radio transmitter devices plus a threshold, otherwise the filter coefficient is set to a default value;
transmit the filter coefficient value for received strength measurement to the at least one wireless device;
receive from the at least one wireless device an uplink signal containing information relating to an uplink power determination that is based on the reference signal received by the at least one wireless device and the information relating to the transmission power of the base station received by the at least one wireless device;
transmit to the at least one wireless device the information relating to the filter coefficient value for a signal power measurement made by the at least one wireless device, wherein the filter coefficient value is used to by the wireless device to determine an uplink power setting from the wireless device to the base station or to at least one radio transmitter device disposed in the macro cell, wherein the uplink power setting is determined based at least in part on a path loss estimation that is smoothed with a filter using the filter coefficient value.

14. The apparatus according to claim 13, wherein the processor is further configured to cause the radio-frequency transceiver to transmit the reference signal simultaneously with the at least one radio transmitter device.

15. The apparatus according to claim 13, wherein the processor is further configured to cause the radio-frequency transceiver to transmit the reference signal simultaneously with a plurality of the radio transmitter devices.

16. The apparatus according to claim 13, wherein the value of the filter coefficient disables an open-loop power control function in the at least one wireless device.

17. The apparatus according to claim 13, wherein the processor is further configured to cause the radio-frequency transceiver and the at least one radio transmitter device to transmit to the at least one wireless device information relating to a reference signal of the macro cell.

* * * * *